Patented Apr. 8, 1941

2,238,026

UNITED STATES PATENT OFFICE 2,238,026

FLUORESCENT MATERIAL AND METHOD OF PREPARING THE SAME

William R. Moore, Emporium, Pa., assignor to Hygrade Sylvania Corporation, Salem, Mass., a corporation of Massachusetts No Drawing. Application November 27, 1937, Serial No. 176,915

9 Claims. (Cl. 250—81)

This invention relates to materials which are excitable to fluorescence by radiations or bombardment for example by ultra violet light, X-rays, cathode rays and the like; and also to methods of preparing such materials.

A principal object of the invention relates to material which is well suited for use as a fluorescent screen in such devices as cathode ray tubes, tuning indicators, oscilloscopes, television tubes and the like. Another object is to provide a novel method of preparing such material.

Zinc orthosilicate ($2ZnO.SiO_2$) which occurs naturally as Willemite or Troostite depending on whether a smaller or larger amount of manganese replaces the zinc, has been used quite extensively for making fluorescent screens for cathode ray tubes, particularly oscilloscopes. The material is easily obtained and yields a comparatively high luminous efficiency for a long period of time. It is very stable and can be employed successfully for example in ultra high frequency oscilloscopes with electron velocities as high as 100 kv. Its fluorescent color is green, and while this color is not particularly objectionable in oscilloscopes, it is very undesirable in fluorescent screens for television purposes. Experience shows that a slightly bluish or yellowish fluorescent screen may be substituted for a "black and white" television picture screen without unduly calling the attention of an observer to the fact that the color of the reproduced picture is materially different from black and white. The preference of the human eye for the bluish hue as compared for example with the greenish hue in a television picture, may be explained by the Purkinje effect, i. e. the shifting of the sensitivity of the eye toward the blue at low levels of illumination. While the acceptance of yellow in place of white may be the result of the habit of using artificial light sources for general illumination, in that the yellowish reflection from a white surface under the influence of the common artificial light sources, e. g. electric incandescent lamps and the like, is subjectively interpreted as white. Accordingly it is another principal object of this invention to provide a stable material similar in composition to the usual zinc silicate, but which has a fluorescent color different from the usual objectionable green.

A feature of the invention relates to a yellowish fluorescent zinc silicate which can be prepared in a simple manner and is substantially insensitive to small variations in temperature or other condition requirements of the processing specifications.

Another feature relates to a material of yellowish fluorescence which does not require the extreme precautions necessary in the production of some of the usual commercial fluorescent materials.

Another feature relates to a fluorescent material which is ready for use immediately after firing and without any further processing.

A further feature relates to a material of yellowish fluorescence which is obtained by mixing metasilicic acid powder and zinc carbonate powder in approximately monomolecular ratio with a small amount (e. g. 0.2% to 3.0%) of an activator such as manganese fluoride.

A further feature relates to the method of treating zinc silicate with a manganese activator to produce a yellowish fluorescent material by heating in a carbon crucible in the presence of an inert, or a neutral or reducing gaseous atmosphere, the temperature of firing being correlated to the amount of the activator used.

A still further feature relates to the novel combination and organization of steps for producing a screen material for television tubes, the said material having a yellowish fluorescence.

Other features and advantages not specifically enumerated will be apparent after a consideration of the following detailed descriptions and the appended claims.

According to the invention the yellowish fluorescent material is prepared by mixing metasilicic acid and zinc carbonate powders in approximately monomolecular ratio, with a small amount of manganese activator, for example 0.2% to 3.0% manganese fluoride. The mixture is then fired in a covered carbon crucible for at least ten or fifteen minutes at a temperature of between 600 and 950 degrees centigrade, after which it is allowed to cool slowly. One preferred manner of preparing the material is to mix very pure grades of $H_2SiO_3$, $ZnCO_3$, and $MnF_2$, in powdered form. The powdered materials are dried in any manner well known in the art, and the dried materials are then thoroughly mixed in the approximate weight-ratio 10:5:1 for the $ZnCO_3$, $H_2SiO_3$ and $MnF_2$ respectively. A small quantity of this mixture is then placed into a carbon crucible covered with a close fitting carbon lid. After the lid is put on, the crucible is placed into a gas furnace which previously has been brought up to 850 degrees C., and left there at least for 10 minutes, depending on the size of the crucible used. It is then taken out and cooled in air. The weight ratios given above will yield, after firing, a composition of ZnO and $SiO_2$ in approximately monomolecular proportions with a weight concentration of Mn of about 0.5%.

I have found that the temperature of firing should be correlated to the concentration of the manganese activator which may be introduced either as $MnF_2$, as the "preferred process" or e. g. as $KMnO_4$, $MnSO_4$, or $MnCO_3$, etc. If the lower range of firing temperature is employed, for example about 600 degrees C., and the desired yellowish fluorescent product is desired, the manganese activator has to be near the upper limit given above, namely of the order of 3.0%. For high firing temperatures, for example of the order of 950 degrees C., the manganese concentration should be lower, namely of the order of 0.2%.

In place of mixing the powders of $H_2SiO_3$ and $ZnCO_3$ as described above, it is possible to start with $SiO_2$ and $ZnO$, or any other convenient initial material. The process is not sensitive to variations of the molar ratios of these initial ingredients, although it is preferred to employ a monomolecular ratio or a ratio close to a monomolecular ratio. Furthermore instead of firing the materials in a carbon crucible in a gas furnace, a muffle furnace may be used. In this latter case, the carbon crucible may be replaced by a porcelain crucible in a controlled atmosphere e. g. of $H_2$, $CO$, $CO_2$, $N_2$, A, He or other reducing or neutral gas.

I have found that in order to obtain a larger grain size in the finished material, which may be desirable in certain cases, e. g. where the material is to be deposited on a support by an air settling process such as is employed in the formation of a cathode ray tube screen, a "flux" may be used such as NaCl, $MgF_2$, $H_3BO_3$, etc., in concentrations up to 20%. These materials have the property of producing larger grain sizes at temperatures below the melting point of the mixture. It is understood therefore that the term "flux" as herein employed refers to any such materials which have the property of increasing the grain growth or formation at a temperature below the melting point of the mixture.

If the initial materials are further purified, particularly if they are freed from volatile substances, it is possible to obtain the required gaseous atmosphere in a sealed crucible which may be sealed by water glass, boric acid, or any other suitable material.

While certain specific materials, proportions, temperatures and the like have been described herein, it will be understood that comparatively wide variations may be made therein without departing from the spirit and scope of the invention.

What I claim is:

1. The method of preparing zinc silicate having a yellowish fluorescent color under cathode-ray bombardment which includes the steps of firing a zinc silicate-forming batch with an activator in a non-oxidizing gaseous atmosphere at a temperature of approximately 600° C. to 950° C., and then slowly cooling the fired material.

2. The method according to claim 1 in which the cooling is effected while said material remains in the said gaseous atmosphere.

3. The method of preparing zinc silicate having a yellowish fluorescent color under cathode-ray bombardment which includes the steps of firing a zinc silicate forming batch with an activator in a gas furnace having a reducing gaseous atmosphere therein at a temperature of approximately 600° C. to 950° C., and slowly cooling the fired material while in said atmosphere.

4. The method of preparing zinc silicate having a yellowish fluorescent color under cathode-ray bombardment which includes the steps of depositing a zinc silicate-forming batch with an activator in a porcelain crucible in a muffle furnace at a temperature of approximately 600° C. to 950° C., and maintaining a non-oxidizing gaseous atmosphere around the material.

5. The method according to claim 4 in which an atmosphere of $H_2$ is maintained in the furnace.

6. The method according to claim 4 in which an atmosphere of $CO_2$ is maintained in the furnace.

7. The method according to claim 4 in which an atmosphere of an inert gas is maintained in the furnace.

8. The method of preparing a zinc silicate having a yellowish fluorescent color under cathode-ray bombardment which includes the steps of, mixing ZnO and $SiO_2$ in approximately equal molecular ratios and with an activator, firing the mixture in a non-oxidizing atmosphere at a temperature approximately 600° C. to 950° C., and allowing the fired material to cool slowly.

9. The method according to claim 1, in which an activator in the form of manganese salt is employed, the percentage of the activator being correlated with the firing temperature so that for firing temperatures approaching 900° C., a smaller percentage of activator is employed as compared with the percentage of activator when the firing temperature approaches 600° C.

WILLIAM R. MOORE.